United States Patent [19]

Stuhr

[11] 4,135,121
[45] Jan. 16, 1979

[54] VARIABLE-SPEED DRIVE SYSTEM WITH HYDROSTATIC TRANSMISSION AND ELECTRIC SHUNT MOTOR

[75] Inventor: Hans W. Stuhr, Aschaffenburg, Germany

[73] Assignee: Linde Aktiengesellschaft, Wiesbaden, Germany

[21] Appl. No.: 797,179

[22] Filed: May 16, 1977

Related U.S. Application Data

[63] Continuation-in-part of Ser. No. 564,594, Apr. 3, 1975, abandoned.

[30] Foreign Application Priority Data

Apr. 4, 1974 [DE] Fed. Rep. of Germany ....... 2416363

[51] Int. Cl.² ............................................. H02P 5/00
[52] U.S. Cl. .................................... 318/358; 318/335; 417/45
[58] Field of Search ............... 318/335, 358, 533, 481; 417/45, 12

[56] References Cited

U.S. PATENT DOCUMENTS

| | | | |
|---|---|---|---|
| 2,590,022 | 3/1952 | Larkin | 417/12 |
| 3,885,204 | 5/1975 | Abels et al. | 318/139 |

*Primary Examiner*—Robert K. Schaefer
*Assistant Examiner*—M. K. Mutter
*Attorney, Agent, or Firm*—Karl F. Ross

[57] ABSTRACT

A drive system for a utility vehicle, such as a fork-lift truck, comprises a hydrostatic transmission whose pump is driven by an electric shunt-wound motor having a field winding so energized, under the control of a potentiometer responsive to the fluid pressure in the transmission, that the field current varies inversely with transmitted torque over at least a portion of the speed range of the vehicle. The automatic potentiometer control exerted by the fluid pressure may be overridden by a manually operable lever. The same potentiometer can be used to vary the motor speed in response to the output pressure of another pump which is driven by the electric motor and coupled with the fork-lifting mechanism of the vehicle.

15 Claims, 5 Drawing Figures

VARIABLE-SPEED DRIVE SYSTEM WITH HYDROSTATIC TRANSMISSION AND ELECTRIC SHUNT MOTOR

CROSS-REFERENCE TO RELATED APPLICATION

This application is a continuation-in-part of my copending application Ser. No. 564,594, filed Apr. 3, 1975 and now abandoned.

FIELD OF THE INVENTION

My present invention relates to a system for driving a load, e.g., a utility vehicle such as fork-lift truck used for the transportation of cargoes in a factory or a warehouse, which is powered by an electric motor via a hydrostatic transmission whose speed ratio (i.e. the ratio of its input and output velocities) can be continuously varied, as is well known, by changing the setting of a control member in its pump and/or its motor unit.

BACKGROUND OF THE INVENTION

In commonly owned U.S. Pat. No. 3,885,204 there has been disclosed a drive system of this nature wherein the pump unit of a hydrostatic transmission is mechanically linked with the shaft of a battery-powered d-c motor of the shunt-wound type whose speed, representing the input velocity of the transmission, can be varied by changing the energization of its field winding with the aid of a potentiometer or equivalent adjustable impedence means in circuit therewith. A setting member on the hydrostatic pump unit is connected with an accelerator pedal for actuation by the driver of a vehicle equipped with this system; the pedal also controls the potentiometer in series with the field winding of the electric shunt motor so as to vary the energization of that winding in a sense accelerating the motor with progressive depression of the pedal. In this manner, for reasons fully explained in the patent, the efficiency of the system is improved.

The increase in field current under partial load, resulting from the reduced potentiometer resistance upon retraction of the pedal, conserves the energy of the supply battery since the electric motor runs at reduced speeds under these conditions. In fact, as likewise described in the prior patent, the motor may act as a generator when the vehicle is hydrostatically braked to standstill by the release of the pedal, thereby returning some of its mechanically stored energy to the battery.

The aim of optimizing the efficiency of the system is, however, only partly achieved with the solution proposed in the prior patent. Thus, the position of the pedal (and therefore of the control member of the hydrostatic pump) is not unequivocally related to either the input velocity of the hydrostatic transmission or the torque transferred to the load from the motor of the transmission. Since the product of output velocity and torque represents the power delivered to the load, either of these factors can vary at the expense of the other under given loading conditions. Conversely, the maintenance of a certain speed requires a larger torque under high load (e.g. during uphill driving) than under low load. The change in pump speed dependent upon the pedal position, jointly with a variation in the potentiometer setting, does not invariably lead to an optimum speed ratio.

OBJECTS OF THE INVENTION

An object of my present invention accordingly, is to provide an improved load-driving system of the character just discussed which operates even more efficiently than that of the prior patent referred to.

A more particular object is to extend the improvement of efficiency to a system driving a plurality of loads, e.g. the traction wheels of a utility vehicle and a cargo-lifting mechanism carried on that vehicle.

SUMMARY OF THE INVENTION

In accordance with my present invention, the energization of the field winding of a shunt motor driving a generator of hydraulic pressure for the displacement of a load is controlled by a load-responsive device to vary the operating speed of the motor, over at least a part of a range of output velocities, generally in proportion to load. In the more specific case of a hydrostatic transmission, in which the pressure generator is a pump unit, fluidically linked with a motor unit, the load-responsive device is a torque sensor connected to that transmission, preferably a hydraulic cylinder communicating with the conduit means by which the hydrostatic pump and motor units are fluidically interlinked. Other possible torque sensors, well known per se, include devices for measuring the pressure of a thrust bearing or the tension of a transmission belt which links the hydrostatic motor with its load or the hydrostatic pump with its drive motor.

According to another feature of my invention, the effect of the torque sensor upon the energization of the field winding may be optionally overridden by a manual actuating element such as a lever (the term "manual" should not be construed as limited to hand-operated elements but extends to other driver-operated devices such as a pedal). The actuating element could also be linked by a lost-motion coupling with the setting member or linkage of the hydrostatic pump and/or motor units so that in a position of maximum speed ratio, with the accelerator pedal fully depressed, the electric motor runs at its highest velocity regardless of the actual fluid pressure of the hydrostatic transmission. The maximum speed ratio, as will be readily understood, is attained in a position in which the displacement rate of the pump has its highest value relative to the absorption rate of the hydrostatic motor.

BRIEF DESCRIPTION OF THE DRAWING

The above and other features of my invention will now be described in detail with reference to the accompanying drawing in which.

SPECIFIC DESCRIPTION

Figure 1:
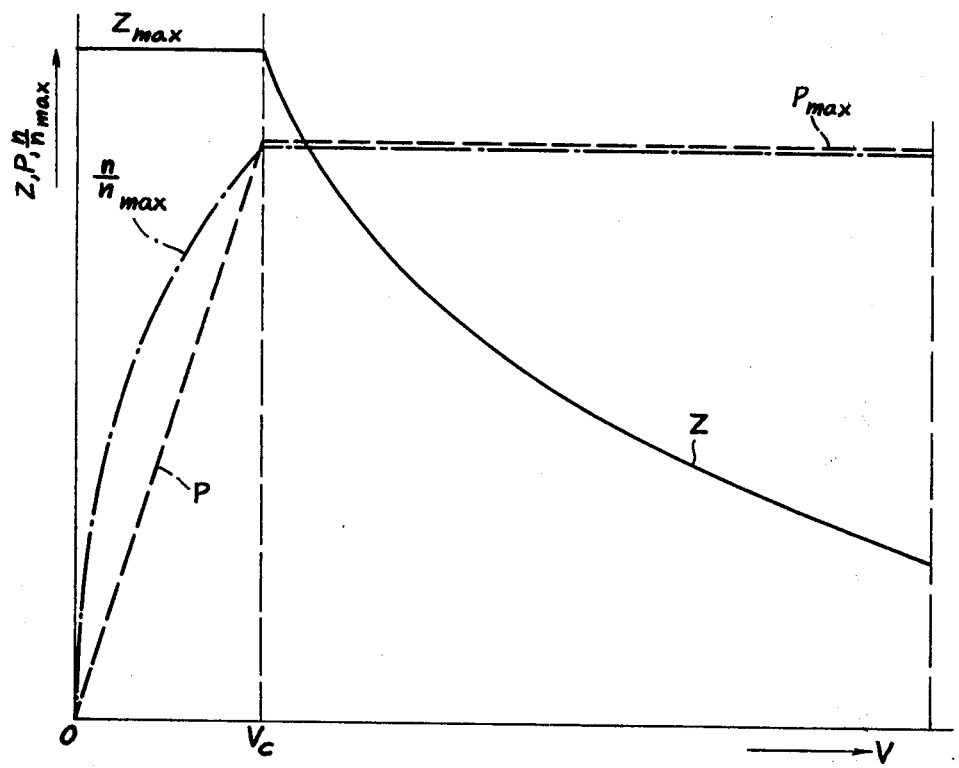
FIG. 1 is an explanatory diagram similar to FIG. 6 of prior U.S. Pat. No. 3,885,204.

In FIG. 1 there have been plotted, as a function of the output velocity V (i.e. motor speed) of a hydraulic transmission, the torque Z delivered by the motor shaft of that transmission, the ratio $(n/n_{max})$ of the actual input velocity (i.e. pump speed) n to the maximum input velocity $n_{max}$ represented by the top speed of its electric driving motor, and the power P delivered by the transmission to its load, with $P = ZV$. For output velocities V above a critical value $V_c$, the power P cannot increase beyond a value determined by the wattage of the electric drive motor. In the case of a vehicular drive, as more particularly described hereinafter, the torque $Z_{max}$ determining the limit $P_{max}$ of this power is advantageously chosen at or slightly below the level at which the traction wheels of the vehicle begin to slip.

In the part of the velocity range between O and $V_c$, the maximum torque $Z_{max}$ is constant and depends on the highest permissible fluid pressure within the hydrostatic transmission as determined by the usual safety valves. The point $V_c$ is reached when the pump is driven at its maximum speed $n_{max}$ and depends on the speed ratio between the two hydrostatic units which of course should be consistent with the aforementioned limiting fluid pressure. Beyond that point, the constancy of $P_{max}$ dictates a hyperbolic decrease of the torque Z as shown.

As will be apparent from FIG. 1, an output power less than the value plotted for P can be established for any given velocity V by reducing either the input speed n or the torque Z (or both) below the values given in the respective graphs for that particular output velocity. In accordance with my present invention, and in contradistinction to the teachings of prior U.S. Pat. No. 3,885,204 discussed above, I choose the pump speed n as a function of the actually measured torque Z whereby a decrease in load, resulting in the reduction of torque for a given velocity V, manifests itself in a deceleration of the electric drive motor so that the operator need not reduce the speed ratio of the hydrostatic transmission to the extent otherwise necessary in order to maintain the existing output velocity V. Conversely, an increase in load causes an acceleration of the drive motor (if the latter operates at less than its maximum speed $n_{max}$) whereby the velocity V can again be maintained with little or no change in the speed ratio.

Figure 2:
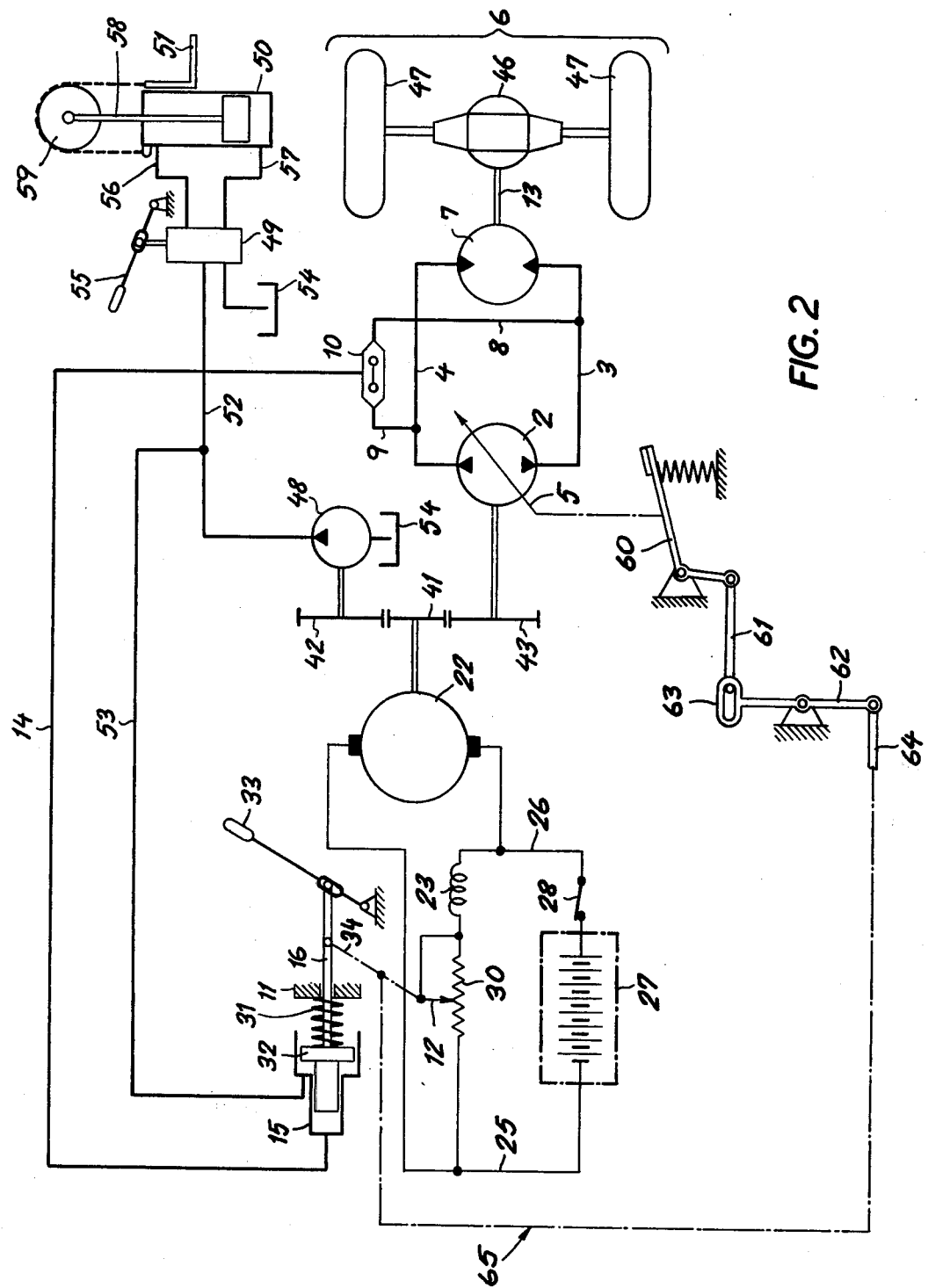
FIG. 2 is a hydraulic circuit diagram of a system embodying my invention.

In FIG. 2 I have shown a drive system operating according to the principles just explained. An electric d-c motor, powered by a battery 27 aboard a fork-lift truck, comprises an armature 22 shunted by a field winding 23, the latter being in series with a potentiometer 30 having a slider 12. The shaft of motor armature 22 carries a pinion 41 which drives, through respective gears 42 and 43, a hydraulic pump 48 and a hydrostatic pump 2. An associated hydrostatic motor 7 is fluidically linked with pump 2 through a pair of conduits 3, 4 serving for the transfer of energy from the pump to the motor (or vice versa in the case of deceleration when the roles of units 2 and 7 are interchanged). Hydrostatic motor 7 is connected via a shaft 13 and a differential gearing 46 to a load 6 represented by a pair of traction wheels 47 for the propulsion of the vehicle. A second load, in the form of a lifting fork 51, can be hydraulically driven from pump 48 via a conduit 52, a switchover valve 49 controlled by a lever 55 and a pair of branch lines 56, 57 alternately connecting two ports of a hydraulic cylinder 50 to conduit 52 and to a sump 54. Cylinder 50 contains a piston 58 which raises or lowers the fork 51 through a hoist 59.

A pressure discriminator in the form of a double check valve 10, connected across conduits 3 and 4 by way of respective branch lines 8 and 9, supplies fluid pressure to a line 14 from whichever of the two conduits 3, 4 is under higher pressure. Line 14 terminates at an inlet of a hydraulic cylinder 15 confronting a small-area face of a piston 32 which is urged to the left, i.e. toward that inlet, by a compression spring 31 bearing upon a fixed stop 11. Another fluid line 53 branches off the conduit 52 and extends to a second inlet of cylinder 15 confronting a large-area face of piston 32. This piston has a rod 16 articulated to a hand lever 33.

The slider 12 of potentiometer 30 is connected by a linkage 34, indicated schematically, with the piston rod 16 so as to shift either to the left or to the right, depending on the magnitude of the pressure in lines 14 and/or 53. In its left-hand position, corresponding to low fluid pressure and therefore to a small torque Z (FIG. 1), the potentiometer 30 is substantially short-circuited so that its effective resistance is low and the current through field coil 23 is high, thereby holding down the speed of electric motor 22, 23. When the torque Z and, therefore, the pressure in line 14 rise, piston 32 is pushed to the right and entrains the slider 12 so that an increasing resistance of potentiometer 30 lies in series with coil 23, thereby reducing the field current and increasing the motor speed. Hydrostatic pump 2, positively coupled with motor armature 22, is correspondingly accelerated under these circumstances to deliver the higher power required by the load 6.

Pump 2 has a control member 5 which is mechanically linked with a spring-loaded accelerator pedal 60, the latter being coupled to slider 12, piston rod 16 and lever 33 via a linkage 65 including an arm 61, a lever 62, a lost-motion connection 63 between the arm and the lever, and a further arm 64. This linkage is so designed that a full depression of the pedal 60, into what may be termed a kick-down position, drives the potentiometer slider to the right (against the force of biasing spring 31) so that the current through field coil 23 is throttled to the maximum extent possible and motor armature 22 runs at top speed regardless of the magnitude of the fluid pressure acting upon the torque sensor 15, 32. The hydraulic speed control, accordingly, can be overridden by manual actuation of lever 33 as well as by full depression of pedal 60. Except in the kick-down position, i.e. throughout substantially its entire adjustment range, slider 12 is mechanically independent of pedal 60 with which it is thus coupled only through the intermediary of the torque sensor.

Since the hydraulic pressure in transmission 2-7 is generally higher than that in the output of pump 48, the face of piston 32 confronting the inlet from line 14 is chosen smaller than that confronting the inlet from line 53 as described above. With the transmission at standstill, i.e. with control member 5 in its zero-stroke position brought about by the release of pedal 60, lifting fork 51 may be operated under the control of lever 55 and valve 49 which normally connects the conduits 52, 53 directly to the sump 54. Thus, the output pressure of pump 48 can be used to adjust the speed of motor armature 22 by way of potentiometer 30, a larger output pressure again calling for a reduction in field current and a consequent increase in motor speed. It is also possible to operate the lifting fork 51 with the vehicle in motion. Lever 55 could have an extreme position overriding, e.g. by a lost-motion linkage, the restoring force of spring 31 even in the absence of sufficient pressure in line 53 whereby motor 22 would drive the pump 48 at high speed with little or no load on fork 51.

Instead of a single cylinder 15 and piston 32 for the two fluid lines 14 and 53, I may provide two separate cylinders and pistons both linked with the slider 12; in that case the two pistons may be loaded by springs of different strengths commensurate with the hydraulic pressures acting thereon.

It will be apparent that the system shown in FIG. 2 can also operate with recovery of inertial energy upon a braking of the vehicle, as described in prior patent No. 3,885,204. The potentiometer 30 in series with field winding 23 may be replaced by other current-control means including, for example, a transistor circuit as likewise disclosed in the prior patent.

Although FIG. 2 shows only the pump 2 provided with a setting member 5, such a setting member could also be present on motor 7 in order to vary the speed ratio of the hydrostatic transmission. In that case I prefer to control both hydrostatic units 2 and 7 by the accelerator pedal 60, with progressive increase in the delivery rate of the pump in a lower speed range and progressive decrease in the absorption rate of the motor in a higher speed range. Since a change in the setting of motor 7 modifies the ratio between the fluid pressure in the hydraulic transmission and its output torque Z, such a change ought to be reflected in a compensatory variation of the effect of the pressure in line 14 upon the energization of drive motor 22. This may be accomplished, for example, by a mechanical shifting of cylinder 15 or potentiometer 30.

Figure 3:
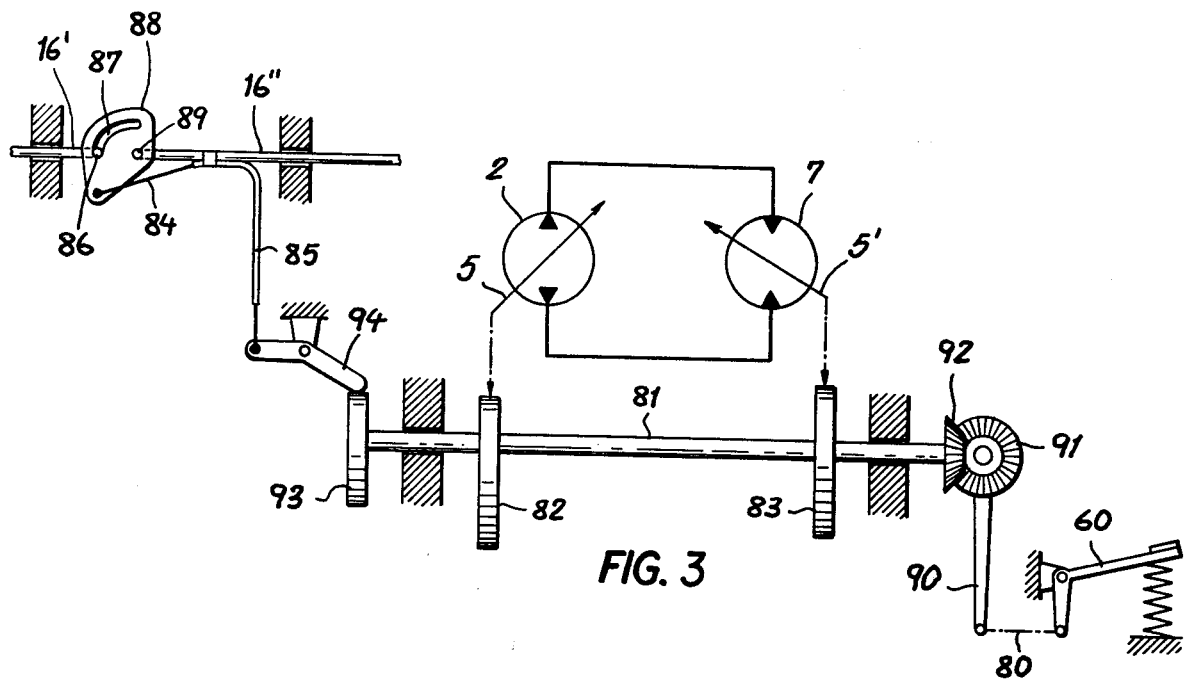

Such an arrangement has been illustrated in FIG. 3 where setting members 5 and 5' of pump 2 and motor 7 are controlled by pedal 60 via a transmission including a link 80 connected with an arm 90, two bevel gears 91, 92, a shaft 81 and a pair of cams 82, 83. Another cam 93 on shaft 81 acts upon a bell-crank lever 94. This lever is tied to the core 84 of a Bowden cable having its sheath 85 secured to a part 16" of rod 16 whose other part 16' is linked therewith through a pin 86 received in a camming slot 87 of a plate 88 articulated to part 16" at 89. Cable core 84 engages the plate 88 to reduce the effective length of rod 16', 16" with a decreasing absorption rate in a manner compensating for variations in the setting of hydraulic motor 7 as discussed above. In the lower speed range, cam 82 progressively displaces the setting member 5 against the force of a nonillustrated restoring spring while setting member 5' remains stationary and lever 94 rides on a low dwell of cam 93. In the higher speed range, setting member 5 no longer moves while cams 83 and 93 go into action, plate 88 being rotated counterclockwise concurrently with setting member 5' which is also suitably spring-loaded.

Figure 4:
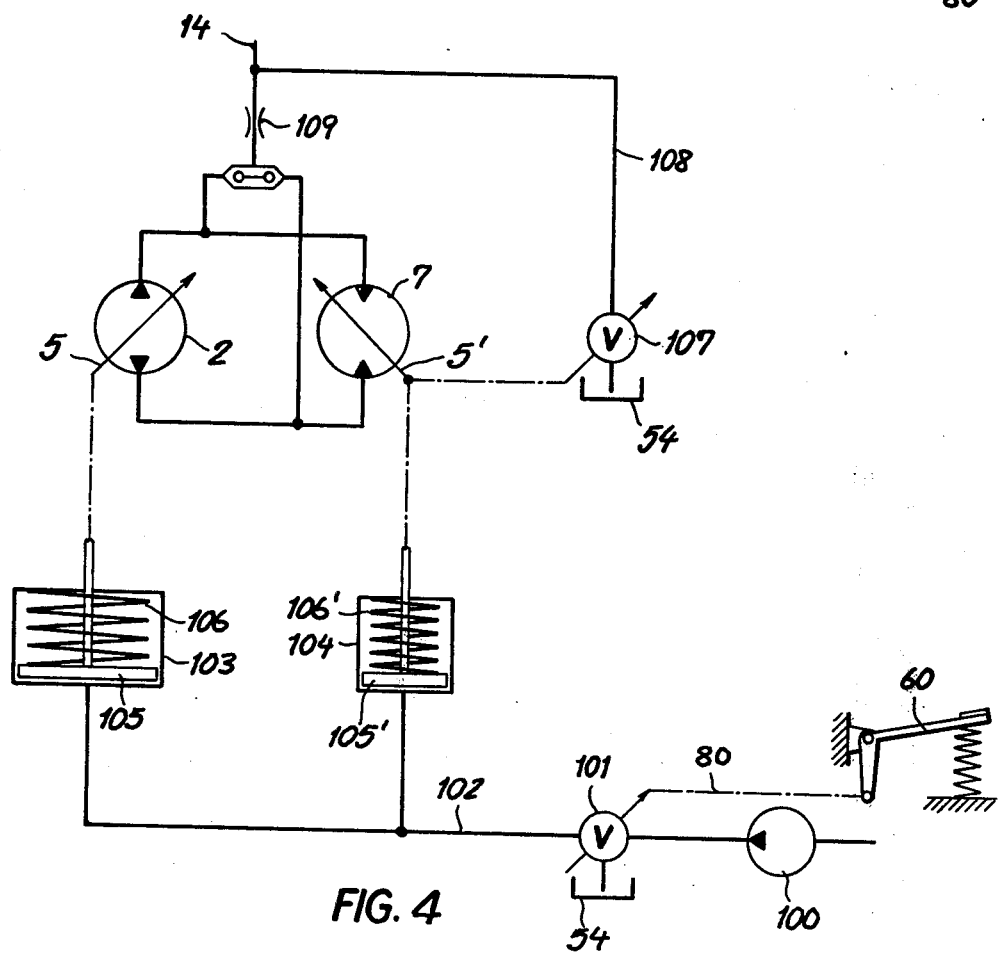

As shown in FIG. 4, a similar result can be obtained hydraulically with the aid of an ancillary pump 100 which, through a pressure-regulating valve 101 controlled by the pedal 60 via link 80, feeds two cylinders 103, 104 in parallel. Cylinder 103 has a piston 105 mechanically connected with setting member 5, working against a spring 106; cylinder 104, similarly, has a piston 105' mechanically connected with setting member 5', working against a spring 106'. Owing to the larger face of piston 105, and/or the greater resistance of spring 106', setting member 5 is again displaced to the end of its stroke before setting member 5' is moved from its normal position. Piston 105' is also linked with a bleeder valve 107 inserted in a branch 108 of high-pressure line 14 leading back to the sump 54; thus, as setting member 5' is displaced, fluid pressure in line 14 is proportionally diminished. Naturally, the pressure-reducing means 107, 108 of FIG. 4 could be replaced by the rod-contracting means 84 – 89 of FIG. 3, or vice versa. Line 14 contains a throttle valve 109 upstream of branch 108.

Figure 5:
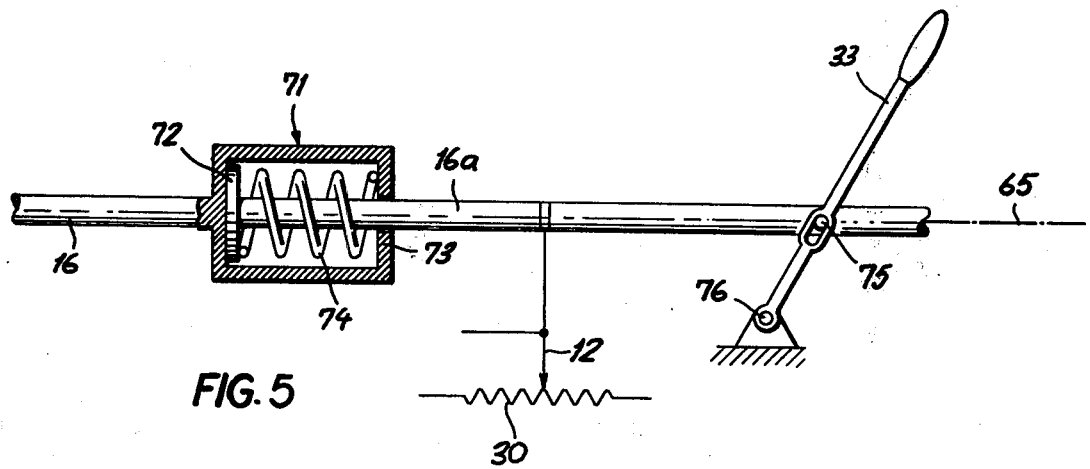
FIGS. 3 - 5 are fragmentary views showing partial modifications of the system of FIG. 2.

To simplify the task of restoring the system to normal hydraulic control after an overriding operation of the manual actuating means 33 or 60, the piston rod 16 may be connected with slider 12 as well as with lever 33 and linkage 65 through a undirectionally yieldable spring coupling rather than directly as indicated in FIG. 2. This has been illustrated in FIG. 5 where rod 16 is integral with a housing 71 receiving a disk 72 which is rigid with an extension 16a of that rod and is normally pressed against a wall of that housing by a strong spring 74 abutting the opposite housing wall 73. Rod extension 16a is joined to slider 12 and linkage 65 while being articulated at 75 to lever 33 which has a fixed fulcrum at 76. Spring 74 maintains housing 71 and disk 72 in their illustrated relative position as long as no overriding force is applied by lever 33 or linkage 65. Naturally, such an extension 16a could also be provided on the divided rod 16', 16" of FIG. 3. In contradistinction to piston rod 16, slider 12 is positively connected with lever 33 so as to be entrained by the latter even if the spring 74 opposed by the spring 31 of FIG. 1 yields as the lever is manually moved to the right.

I claim:

1. A system for driving a load, comprising:
   a source of electric current;
   an electric motor having an armature and a field winding connected in parallel across said source;
   a transmission with a continuously variable ratio of input and output velocities, said transmission including a hydrostatic pump unit mechanically connected with said armature, a hydrostatic motor unit coupled with said load and conduit means interlinking said hydrostatic units for hydraulic power transfer therebetween, whereby a torque is applied by said hydrostatic motor unit to said load;
   manual setting means connected to at least one of said hydrostatic units for selectively varying said ratio over a predetermined adjustment range;
   torque-sensing means connected to said transmission; and
   current-control means in circuit with said field winding connected to said torque-sensing means for varying the energization of said field winding generally inversely with said torque over at least a part of a range of output velocities whereby the input velocity of said transmission varies generally in proportion to torque throughout said part of said range of output velocities, said current-control means being coupled with said setting means only through the intermediary of said torque-sensing means throughout substantially all of said adjustment range.

2. A system as defined in claim 1, further comprising manual actuating means linked with said current-control means for optionally overriding the effect of said torque-sensing means.

3. A system as defined in claim 1, further comprising a lost-motion coupling between said actuating means and said setting means for making said torque-sensing means ineffectual in a maximum-speed-ratio position of said setting means representing an end of said adjustment range.

4. A system as defined in claim 1 wherein said torque-sensing means comprises a hydraulic cylinder fluidically connected to said conduit means and a spring-loaded piston in said cylinder displaceable by fluid pressure in said conduit means.

5. A system as defined in claim 4 wherein said load comprises a traction wheel of a vehicle equipped with a cargo-lifting mechanism, said mechanism including a hydraulic pump driven by said electric motor, said cylinder being provided with a branch connection to a discharge port of said hydraulic pump for controlling the speed of said electric motor.

6. A system as defined in claim 5 wherein said cylinder has a first inlet communicating with said conduit means and a second inlet communicating with said branch connection, said piston having a small-area face confronting said first inlet and a large-area face confronting said second inlet.

7. A system as defined in claim 4 wherein said current-control means comprises a potentiometer in series with said field winding having a slider mechanically linked with said piston.

8. A system as defined in claim 4, further comprising manual actuating means linked with said piston for optionally overriding the effect of said fluid pressure.

9. A system as defined in claim 4 wherein said conduit means comprises a pair of conduits carrying hydraulic fluid at different pressures, the fluidical connection between said conduit means and said cylinder including a pressure discriminator transmitting only the higher of said pressures to said cylinder.

10. A system as defined in claim 9 wherein said pressure discriminator is a double check valve.

11. A system as defined in claim 4 wherein said setting means is connected to said hydrostatic motor, further comprising a coupling between said setting means and said current-control means for modifying the effect of said fluid pressure upon the energization of said field winding to compensate for changes in the fluid-absorption rate of said hydrostatic motor.

12. A system for driving a load, comprising:
a source of electric current;
an electric motor having an armature and a field winding connected in parallel across said source;
a generator of hydraulic pressure fluidically linked with a load and driven by said motor;
pressure-sensing means in the output of said generator; and
current-control means in circuit with said field winding connected to said pressure-sensing means for varying the energization of said field winding generally inversely with load over at least a part of a range of output velocities whereby the input velocity of said generator varies generally in proportion to load throughout said part of said range.

13. A system as defined in claim 12, further comprising manual actuating means linked with said current-control means for optionally overriding said pressure-sensing means to establish high output velocities independently of load.

14. A system as defined in claim 12, further comprising a transmission with a continuously variable ration of input and output velocities including a hydrostatic pump unit mechanically connected with said armature in parallel with said generator, a hydrostatic motor unit coupled with a second load, conduit means interlinking said hydrostatic units for hydraulic transfer therebetween whereby a torque depending on said second load and on said ratio is applied by said hydrostatic motor unit to said second load, and manual setting means connected to at least one of said hydrostatic units for selectively varying said ratio over a predetermined adjustment range, said pressure-sensing means being further connected to said conduit means for making the energization of said field winding additionally dependent upon said torque, said current-control means being coupled with said setting means only through the intermediary of said torque-sensing means throughout substantially all of said adjustment range.

15. A system as defined in claim 8, further comprising a unidirectionally yieldable spring coupling inserted between said actuating means and said piston, said current-control means being connected with said actuating means ahead of said spring coupling for positive entrainment in the yielding direction of said spring coupling.

* * * * *